(12) United States Patent
Koyama et al.

(10) Patent No.: US 7,071,134 B2
(45) Date of Patent: Jul. 4, 2006

(54) HIGH TRANSMITTANCE GLASS SHEET AND METHOD OF MANUFACTURING THE SAME

(75) Inventors: Akihiro Koyama, Osaka (JP); Isamu Kuroda, Osaka (JP); Nobuyuki Yamamoto, Osaka (JP); Yasunori Seto, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 10/772,715

(22) Filed: Feb. 5, 2004

(65) Prior Publication Data

US 2004/0162212 A1     Aug. 19, 2004

Related U.S. Application Data

(62) Division of application No. 10/236,397, filed on Sep. 5, 2002, now Pat. No. 6,831,030.

(30) Foreign Application Priority Data

Sep. 5, 2001   (JP) ............................. 2001-269126

(51) Int. Cl.
 *C03C 3/087* (2006.01)
 *C03B 13/00* (2006.01)
(52) U.S. Cl. .............................. 501/70; 501/71; 65/90
(58) Field of Classification Search ............ 501/70, 501/71; 65/90
See application file for complete search history.

(56) References Cited

U.S. PATENT DOCUMENTS

| 5,069,826 A | 12/1991 | Cheng |
| 5,380,685 A | 1/1995 | Morimoto et al. |
| 5,656,559 A | 8/1997 | Combes et al. |
| 5,714,422 A | 2/1998 | Favrot et al. |
| 5,830,814 A | 11/1998 | Combes |
| 5,837,629 A | 11/1998 | Combes et al. |
| 5,925,583 A | 7/1999 | Yoshii et al. |
| 5,958,811 A | 9/1999 | Sakaguchi et al. |
| 6,054,401 A | 4/2000 | Sugiura et al. |
| 6,326,324 B1 | 12/2001 | Sakaguchi et al. |
| 6,391,810 B1 | 5/2002 | Lenhart |
| 6,395,659 B1 | 5/2002 | Seto et al. |
| 6,436,858 B1 | 8/2002 | Laborde et al. |
| 6,548,434 B1 | 4/2003 | Nagashima |
| 6,612,133 B1 | 9/2003 | Sakaguchi et al. |

FOREIGN PATENT DOCUMENTS

| CN | 1105343 A | 7/1995 |
| EP | 0 688 741 | 6/1995 |
| EP | 0 823 404 | 2/1998 |
| EP | 1 029 826 | 8/2000 |
| JP | 60-215546 | 10/1985 |
| JP | 9-169537 | 6/1997 |
| WO | 95/13993 | 5/1995 |
| WO | WO 01/64595 A1 | 9/2001 |

*Primary Examiner*—J. H. Lorengo
*Assistant Examiner*—Elizabeth A. Bolden
(74) *Attorney, Agent, or Firm*—Hamre, Schumann, Mueller & Larson, P.C.

(57) ABSTRACT

A high transmittance glass sheet is provided that is formed of a soda-lime-silica glass composition containing, expressed in wt. %, less than 0.020% of total iron oxide in terms of $Fe_2O_3$ and 0.006 to 2.0% of zinc oxide. The glass sheet allows the formation of nickel sulfide particles to be suppressed by the addition of a zinc compound to a glass raw material.

2 Claims, 2 Drawing Sheets

HIGH TRANSMITTANCE GLASS SHEET AND METHOD OF MANUFACTURING THE SAME

This is a divisional of application Ser. No. 10/236,397 filed Sep. 5, 2002, which is incorporated herein by reference, and is now issued as U.S. Pat. No. 6,831,030.

BACKGROUND OF THE INVENTION

1. Field of the Invention

The present invention relates to a high transmittance glass sheet of soda-lime-silica glass manufactured mainly by a float process. More specifically, this invention relates to a high transmittance glass sheet that allows the formation of nickel sulfide (NiS) in a process of melting a glass raw material to be suppressed effectively.

2. Related Background Art

In methods of manufacturing a soda-lime-silica glass sheet such as a float process and a roll out process, the following problem may arise. That is, in a process of melting raw materials in a furnace at a high temperature near 1,500° C., metal particles of stainless steel or the like containing nickel (Ni) may be mixed into the raw materials. The metal particles may react with sulfur (S) in salt cake ($Na_2SO_4$) included in the raw materials. As a result of this reaction, nickel sulfide (NiS) is formed as minute foreign matter in glass products. NiS particles are present at a minimal rate of about one per a little over 10 tons of glass products, and are of an extremely minute spherical form having a diameter as small as about 0.3 mm or less. Therefore, it is difficult to detect NiS particles on production lines.

Some soda-lime-silica glass sheets are tempered to be used for buildings, vehicles, cover glass plates for solar cell panels, solar water heaters or the like. In a tempering process, a glass sheet is heated to a temperature near the softening point (about 600° C.) of the glass sheet. Then, the glass sheet is quenched so that compressive stress layers are generated in surfaces of the glass sheet.

When NiS is contained in a tempered glass sheet, NiS is present in an α phase that is stable at about 350° C. or higher, and undergoes phase transition with the lapse of time to a β phase that is more stable at room temperature. This phase transition causes NiS particles to expand in volume. As a result of this, micro cracks may appear in the vicinity of the NiS particles. Inside the tempered glass sheet, a tensile stress layer exists, having a thickness of about two-thirds that of the glass sheet. When cracks appear in the tensile stress layer, the cracks run rapidly to cause spontaneous fracture of the tempered glass sheet.

To prevent such spontaneous fracture of a tempered glass sheet, so-called soaking has been known. In this method, tempered glass sheets are heated to 300° C. or lower in a furnace (soaking furnace). Then, the tempered glass sheets are maintained in the furnace for a predetermined time, so that NiS undergoes phase transition from an α phase to a β phase. This forces the tempered glass into breakage. In this manner, defective glass products containing NiS are eliminated.

However, operations such as the soaking in which heat treatment is mainly performed cost considerable energy and time, thereby causing an increase in manufacturing cost. This also is a serious hindrance to shortening of delivery times and an improvement in productivity. Further, defective products are eliminated in the soaking, thereby causing a decrease in product yield.

JP 9(1997)-169537 A discloses a method of manufacturing a soda-lime-silica glass in which 0.01 to 0.15 wt. % of a zinc compound such as zinc nitrate and zinc sulfate is added to raw materials, thereby allowing the formation of NiS to be suppressed.

Meanwhile, there has been a growing demand that a high transmittance glass sheet, more specifically, a glass sheet having a light color and a high transmittance be used for an interior glass, a showcase, a display case, a high transmittance non-colored window glass, a high transmittance non-colored mirror, a glass substrate for a solar cell panel, a cover glass plate for a solar cell panel, a solar water heater, a material for a high solar-heat transmittance window glass, and a flat display substrate glass such as a front panel or the like. However, no high transmittance glass sheet has been known so far that is suitable for industrial mass production.

SUMMARY OF THE INVENTION

A high transmittance glass sheet according to the present invention is formed of a soda-lime-silica glass composition containing, expressed in wt. %, less than 0.020% of total iron oxide and 0.006 to 2.0% of zinc oxide. In this specification, total iron oxide denotes an amount of iron oxide in terms of $Fe_2O_3$. All of the iron in the composition is counted as $Fe_2O_3$, even if it exists as FeO.

The soda-lime-silica glass composition constituting the high transmittance glass sheet according to the present invention contains less than 0.020 wt. % (less than 200 ppm) of total iron oxide. By maintaining the content of total iron oxide at a low level as described above, it is made easier to obtain a high transmittance glass sheet having, on a 4.0 mm thickness basis, a solar radiation transmittance of 87.5% or higher. Preferably, total iron oxide is contained in an amount of not less than 0.005 wt. % as will be described later.

For the effective suppression of NiS formation in a soda-lime-silica glass composition containing less than 200 ppm of total iron oxide, zinc oxide should be contained, in terms of ZnO, in an amount of not less than 0.006 wt. % (not less than 60 ppm). The addition of zinc oxide does not cause an increase in light absorption in the visible light region. It has been found to be desirable for the suppression of NiS formation that the content of zinc oxide be increased in inverse proportion to the content of total iron oxide. When the content of total iron oxide has a value near 200 ppm, it is required that ZnO be contained in an amount of not less than 60 ppm. When the content of total iron oxide is 50 ppm, preferably, ZnO is contained in an amount of not less than 180 ppm. More preferably, when the content of total iron oxide has a value near 200 ppm, ZnO is contained in an amount of not less than 100 ppm, and when the content of total iron oxide is 50 ppm, ZnO is contained in an amount of not less than 300 ppm.

In manufacturing a high transmittance glass, in order to prevent ZnO from volatilizing during melting to damage a furnace, ZnO should be contained in an amount of not more than 2.0 wt. % (not more than 20,000 ppm). In the case where a float bath is used for forming a glass sheet, in order to prevent ZnO that has volatilized and condensed in the float bath from dropping onto a glass ribbon to form a defect, ZnO is used desirably in an amount of not more than 5,000 ppm, and more desirably in an amount of not more than 1,000 ppm.

This problem, which is caused by dropping of a condensed material that has volatilized, does not occur in the case where a glass sheet is manufactured, instead of using the float bath, for example, by a roll out process in which molten glass is rolled using a roller with an uneven (a predetermined pattern) or an even surface, and by a process in which molten glass that has been allowed to pass through a slit or overflow from a melting tub is drawn.

Thus, as shown in FIG. 1, where an x-coordinate axis indicates the content of the total iron oxide expressed in ppm and a y-coordinate axis indicates the content of the zinc oxide expressed in ppm, the glass composition has contents of the total iron oxide and the zinc oxide whose values fall preferably within a range defined by a square ABCD formed by connecting Point A (200, 60), Point B (200, 20,000), Point C (50, 20,000), and Point D (50, 180) in this order, more preferably within a range defined by a square A'BCD' formed by connecting Point A' (200, 100), Point B (200, 20,000), Point C (50, 20,000), and Point D' (50, 300) in this order, and most preferably within a range defined by a square A'B'C'D' formed by connecting Point A' (200, 100), Point B' (200, 5,000), Point C' (50, 5,000), and Point D' (50, 300) in this order.

The present invention also provides a method of suppressing formation of nickel sulfide in a high transmittance glass sheet having a solar radiation transmittance of 87.5% or higher and/or a visible light transmittance of 90.0% or higher on a basis of a 4.0 mm thick glass sheet. In the method, a glass raw material is prepared so that a content of total iron oxide in terms of $Fe_2O_3$ is less than 0.020 wt % and a content of zinc oxide is 0.006 to 2.0 wt. %, and the glass raw material is melted.

The content of zinc oxide required to suppress the formation of nickel sulfide particles in a glass composition increases as the content of total iron oxide is decreased when the content of the total iron oxide in the glass is in the range of 0.005 to 0.060 wt. %. Since zinc oxide materials are costly compared with other raw materials, it would be cost effective to use zinc oxide in the least possible amount required to suppress the formation of nickel sulfide particles. Therefore, in manufacturing soda-lime glasses successively, when the content of total iron oxide in a glass composition is decreased over time, preferably, the content of zinc in the glass composition is increased accordingly within the range of 0.006 to 0.50 wt. % (60 to 5,000 ppm). Conversely, when the content of the total iron oxide in the glass composition is increased over time, preferably, the content of zinc in the glass composition is decreased accordingly in the above range.

Examples of zinc compounds for zinc oxide (ZnO) that should be added to a raw material include an inorganic zinc compound such as zinc nitrate ($Zn(NO_3)_2.6H_2O$), zinc sulfate ($ZnSO_4.7H_2O$), a zinc halide (e.g. zinc fluoride ($ZnF_2.4H_2O$), zinc bromide ($ZnBr_2$), zinc chloride ($ZnCl_2$) and zinc iodide ($ZnI_2$)) and zinc phosphate ($Zn_3(PO_4)_2.4H_2O$); and an organic zinc compound such as zinc benzoate ($Zn(C_6H_5CO_2)_2$) and zinc acetate ($Zn(CH_3CO_2)_2.2H_2O$). Although these zinc compounds have substantially the same effects, it is most preferable to use at least one selected from zinc nitrate and zinc sulfate from the viewpoint of cost effectiveness or the like.

DETAILED DESCRIPTION OF THE INVENTION

Figure 1:
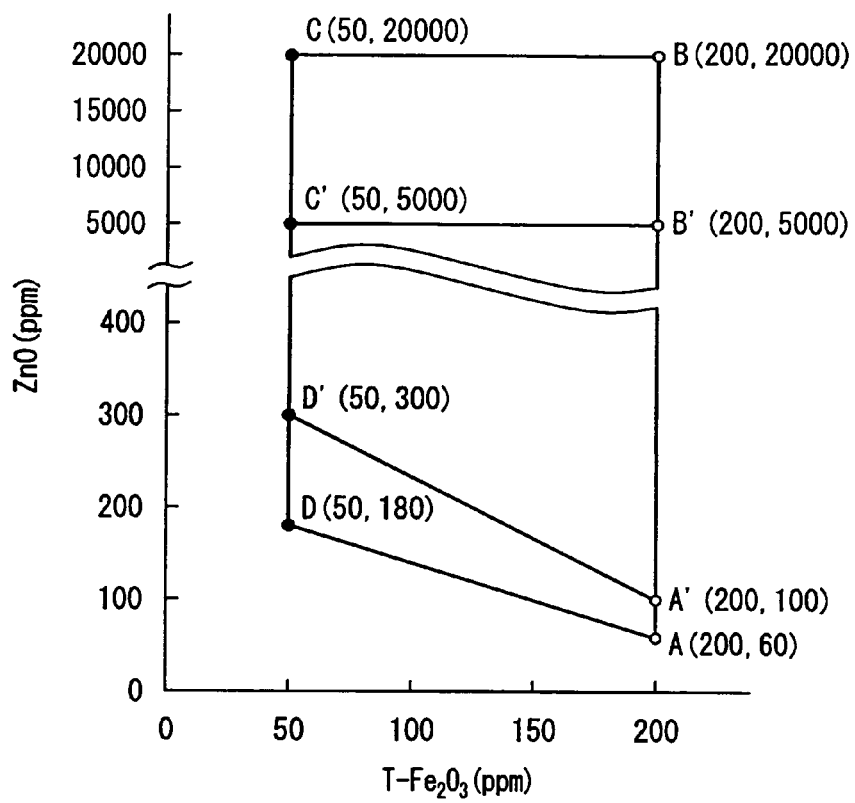
FIG. 1 is a graph showing a preferred relationship between the content of total iron oxide and the content of zinc oxide in a glass composition according to the present invention.

The high transmittance glass sheet according to the present invention is formed of a glass composition containing total iron oxide and zinc oxide as described above. In the following description, the glass composition will be explained in greater detail.

Preferably, the high transmittance glass sheet according to the present invention has the following features. That is, the glass sheet is formed of a soda-lime-silica glass composition that contains in addition to the zinc oxide, expressed in wt. %, 0.005 to less than 0.020% of total iron oxide (hereinafter, referred to as $T-Fe_2O_3$) in terms of $Fe_2O_3$, less than 0.008% of FeO, and 0 to 0.25% of cerium oxide, and has a ratio (hereinafter, referred to as a FeO ratio) of the content of FeO in terms of $Fe_2O_3$ to the content of $T-Fe_2O_3$ of lower than 40%. When measurements are made on a 4.0 mm thickness basis, the high transmittance glass sheet preferably has a solar radiation transmittance of 87.5% or higher, a visible light transmittance as determined using the CIE standard illuminant C of 90.0% or higher, a dominant wavelength as determined using the illuminant C of 540 to 580 nm, and an excitation purity as determined using the illuminant C of 0.35% or lower. Here, the content (wt. %) of the zinc oxide is expressed by a value of an amount of the zinc oxide added with respect to a total amount of 100 wt. % of the other components.

More preferably, the high transmittance glass sheet has the following features. That is, the glass sheet is formed of a composition that is substantially free from cerium oxide (the content of $CeO_2$ is less than 0.005 wt. %) and has a FeO ratio of equal to or higher than 22% to lower than 40%. In this case, when a measurement is made on a 4.0 mm thickness basis, the high transmittance glass sheet has an excitation purity as determined using the illuminant C of 0.25% or lower. This composition allows a high transmittance and extremely light colored glass sheet.

Furthermore, a high transmittance glass sheet that is formed of a glass composition containing 0 to 0.005 wt. % of cerium oxide, not more than 0.03 wt. % of manganese oxide, and not more than 0.01 wt. % of vanadium oxide can achieve the following. That is, when the high transmittance glass sheet is exposed to ultraviolet radiation at a wavelength of not more than 400 nm, for example, ultraviolet irradiation according to the light stability test specified in the Japanese Industrial Standards, R3212, on a 4.0 mm thickness basis, the transmittance (in the near-infrared region) at a wavelength of 1,000 nm can be improved by not less than 0.1%, and in some cases, by not less than 0.3% with respect to that of the glass sheet before being exposed to the ultraviolet radiation. Furthermore, after the ultraviolet irradiation, the solar radiation transmittance and the visible light transmittance of the high transmittance glass sheet also can be increased to 90.0% or higher and 90.5% or higher, respectively. Although not entirely clarified, conceivably, lowering of the FeO ratio contributes to these improvements in the transmittance in the near-infrared region. For example, even when a glass sheet has a FeO ratio of 22% or higher, ultraviolet irradiation allows the FeO ratio to be lowered by 3 to 5%, so that the content of FeO can be reduced to lower than 22%.

Furthermore, it also is more preferable that the high transmittance glass sheet has the following features. That is, the high transmittance glass sheet is formed of a composition that contains, expressed in wt. %, 0.02 to 0.25% of cerium oxide, and has a FeO ratio of lower than 22%. When measurements are made on a 4.0 mm thickness basis, the high transmittance glass sheet has a solar radiation transmittance of 90.0% or higher and a visible light transmittance as determined using the illuminant C of 90.5% or higher. This allows a high transmittance glass sheet to be obtained that exhibits a high transmittance particularly in a region ranging from the visible region to the near-infrared region.

Furthermore, particularly for the efficient conversion of ultraviolet light into visible light, a high transmittance glass sheet is preferred that contains, expressed in wt. %, 0.025 to 0.20% of cerium oxide, and has a ratio of a fluorescence intensity at a wavelength of 395 nm to a fluorescence intensity at a wavelength of 600 nm (f(395 nm)/f(600 nm), hereinafter, referred to also as a fluorescence intensity ratio) of 10 or higher when subjected to ultraviolet irradiation at a wavelength of 335 nm. Furthermore, a high transmittance glass sheet is desired that contains 0.03 to 0.15 wt. % of cerium oxide and has a fluorescence intensity ratio of 15 or higher. Moreover, a high transmittance glass sheet is desired most that contains 0.05 to 0.12 wt. % of cerium oxide and has a fluorescence intensity ratio of 25 or higher, since the glass sheet allows most efficient conversion of ultraviolet light into visible light.

Preferably, the above-mentioned soda-lime-silica glass composition according to the present invention contains, in addition to the iron oxide, the zinc oxide and the cerium oxide that are described above, as components constituting a base glass composition, expressed in wt. %, 65 to 80% of $SiO_2$, 0 to 5% of $Al_2O_3$, 0 to 7% of MgO, 5 to 15% of CaO, where a total content of MgO and CaO is more than 7% and not more than 17%, 10 to 18% of $Na_2O$, 0 to 5% of $K_2O$, where a total content of $Na_2O$ and $K_2O$ is 10 to 20%, and 0.05 to 0.3% of $SO_3$. The content of the above-mentioned zinc oxide is expressed by an amount of the zinc oxide added with respect to a total amount of 100% of the above components constituting the base glass composition.

Furthermore, more preferably, the total content of MgO and CaO (MgO+CaO) is 10 to 17 wt. %, and the content of $SO_3$ is 0.08 to 0.15 wt. %. Moreover, it is desirable that the content of MgO be 0.5 to 7 wt. % since this allows meltability and formability to be improved. Furthermore, it is desirable that the content of $Al_2O_3$ be 0.5 to 5 wt. % since this allows water resistance to be improved.

Hereinafter, the composition of the high transmittance glass sheet according to the present invention will be described in terms of the components other than the zinc oxide described earlier. In the following description, the respective contents of the components are expressed in wt. %.

In glass, iron oxide is present in forms of $Fe_2O_3$ and FeO. $Fe_2O_3$ serves to enhance an ultraviolet-absorbing ability, and FeO serves to enhance a heat-absorbing ability. In order to attain a high transmittance as desired, preferably, the content of T-$Fe_2O_3$ (a total content of $Fe_2O_3$ and FeO in terms of $Fe_2O_3$) is less than 0.020%, and preferably, the content of FeO is less than 0.008%, and the FeO ratio is lower than 40%. When the contents of T-$Fe_2O_3$ and FeO and the FeO ratio reach and become greater than their respective upper limits, the visible light transmittance becomes too low, and the glass takes more on a blue tone of FeO.

When the content of T-$Fe_2O_3$ is less than 0.005%, it is necessary to use high purity materials having low iron contents. This leads to a substantial cost increase. Thus, preferably, T-$Fe_2O_3$ is contained in an amount of not less than 0.005%.

When used for a glass substrate and a cover glass plate for a solar cell panel using amorphous silicon, a glass sheet preferably has a high transmittance with respect to light having a wavelength in the vicinity of 500 to 600 nm and exhibits moderate solar radiation absorption. In this case, preferably, when the content of T-$Fe_2O_3$ is in the above-mentioned range, the content of FeO is more than 0.003% and less than 0.008%, and the FeO ratio is equal to or higher than 22% and lower than 40%.

When used for a glass substrate and a cover glass plate for a solar cell panel using crystalline silicon, preferably, a glass sheet has a high transmittance with respect to light having a wavelength in the vicinity of 1,000 nm. In this case, preferably, when the content of T-$Fe_2O_3$ is in the above-mentioned range, the content of FeO is less than 0.004%, and the FeO ratio is lower than 22%.

Cerium oxide $CeO_2$) is effective in regulating the content of FeO and the FeO ratio. Particularly, in order to attain a low FeO content and a low FeO ratio required when a high transmittance at a wavelength in the vicinity of 1,000 nm is desired, preferably, $CeO_2$ is added in an amount of 0.02 to 0.25%.

Figure 2:
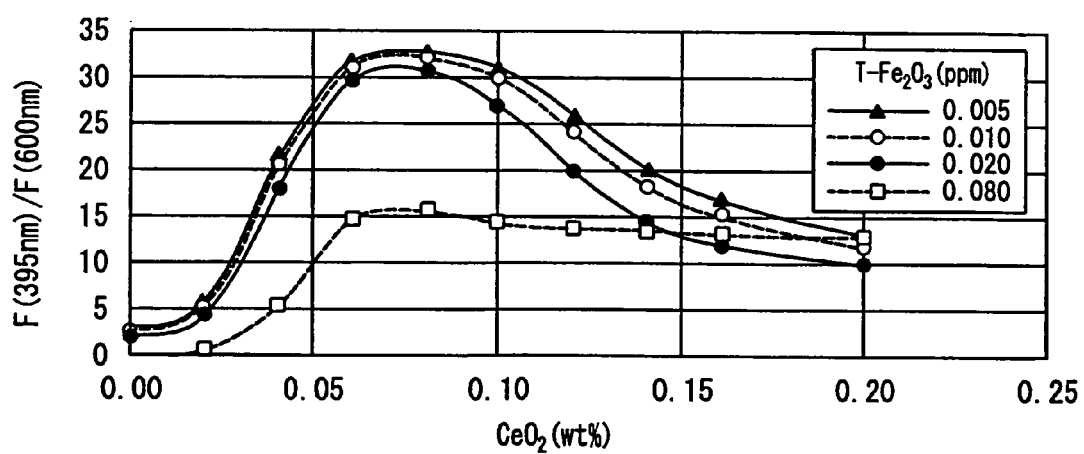
FIG. 2 is a graph showing a relationship between the respective contents of $T-Fe_2O_3$ and $CeO_2$ and a fluorescence intensity ratio.

Furthermore, with respect to glasses containing 0.005 to 0.08 wt. % of T-$Fe_2O_3$ and 0 to 0.20 wt. % of $CeO_2$, a relationship between the content of $CeO_2$ and a fluorescence property is shown in FIG. 2. As shown in FIG. 2, it was found that ultraviolet light was absorbed and converted to visible light most effectively when the content of $CeO_2$ was in a given range. That is, it was found that a high transmittance glass sheet could be obtained that contained less than 0.06% of T-$Fe_2O_3$ and 0.025 to 0.20% of $CeO_2$, thereby achieving a fluorescence intensity ratio of 10 or higher, a fluorescence intensity ratio of 15 or higher when the content of $CeO_2$ was 0.03 to 0.15%, and a fluorescence intensity ratio of 25 or higher when the content of $CeO_2$ was 0.05 to 0.12%.

The high transmittance glass sheet described above is suitable for use for an interior material, a glass for a showcase or the like particularly because the glass sheet takes on a fluorescent color with gradations when ultraviolet light is incident on an edge surface of the glass sheet from a cross sectional direction.

Furthermore, when used for a substrate and a cover glass plate for a solar cell panel or the like, the above-mentioned high transmittance glass sheet is used most suitably since the glass sheet allows energy in the ultraviolet region that hardly contributes to power generation to be converted into light in the visible region, thereby allowing the power generation efficiency to be enhanced.

$SiO_2$ is a main component forming a skeleton of the glass. When the content of $SiO_2$ is less than 65%, the durability of the glass is decreased, and when the content of $SiO_2$ is more than 80%, melting of the glass is hindered.

Although not an indispensable component, $Al_2O_3$ serves to improve the durability and the water resistance of the glass. When the content of $Al_2O_3$ is increased, melting of the glass is hindered. Thus, the content of $Al_2O_3$ should be 0 to 5%. In order to improve the durability and the water resistance, preferably, the content of $Al_2O_3$ is not less than 0.5%. In order not to impair the meltability of the glass, preferably, the content of $Al_2O_3$ is not more than 2.5%. More preferably, the content of $Al_2O_3$ is in the range of 1.0 to 2.5%.

Both MgO and CaO serve to improve the durability of the glass and regulate the liquidus temperature and the viscosity of the glass in a forming process. Although not an indispensable component, MgO allows a low liquidus temperature to be maintained when contained in a moderate amount. Thus, the content of MgO is preferably more than 0.5%, and more preferably not less than 2%. When the content of MgO exceeds 7%, the liquidus temperature is increased excessively. On the other hand, when the content of CaO is less than 5%, the meltability is degraded. Further, when the content of CaO exceeds 15%, the liquidus temperature is increased. Thus, more preferably, the content of CaO is not more than 13%. When a total content of MgO and CaO is not more than 7%, the durability of the glass is decreased. Conversely, when the total content exceeds 17%, the liquidus temperature is increased. Thus, more preferably, the total content is not more than 15%. In the case where the total content of MgO and CaO is as small as, for example, less than 10%, it is required that the content of $Na_2O$ be increased so that the degradation of the meltability and an increase in viscosity of a melt are compensated. This leads to a cost increase and a decrease in chemical durability of the glass. Thus, more desirably, the total content of MgO and CaO is not less than 10%.

Both $Na_2O$ and $K_2O$ serve to accelerate melting of the glass. When the content of $Na_2O$ is less than 10% or when a total content of $Na_2O$ and $K_2O$ is less than 10%, only a poor effect of accelerating glass melting can be obtained. It is not preferable that the content of $Na_2O$ exceeds 18% or the total content of $Na_2O$ and $K_2O$ exceeds 20% since this results in a decrease in the durability of the glass. In applications where water resistance is required particularly, the content of $Na_2O$ is preferably not more than 15%, and more desirably not more than 14.5%. Since a material cost of $K_2O$ is high compared with $Na_2O$, $K_2O$ is not an indispensable component. Even when $K_2O$ is used, it is not preferable that the content of $K_2O$ exceeds 5%.

$SO_3$ serves to accelerate clarification of the glass. When the content of $SO_3$ is less than 0.05%, a sufficient clarifying effect cannot be attained by a regular melting method. Thus, desirably, the content of $SO_3$ is more than 0.1%. Conversely, when the content of $SO_3$ exceeds 0.3%, $SO_2$ produced as a result of decomposition of $SO_3$ remains in the glass in the form of a bubble, and $SO_3$ dissolved in the glass becomes more likely to produce bubbles by reboiling.

Although not an indispensable component, $TiO_2$ can be added in a proper amount for the purposes of enhancing an ultraviolet-absorbing ability or the like as long as the amount is in the range that allows the optical properties that are the intended properties of the present invention not to be impaired. When an excessive amount of $TiO_2$ is contained, the glass becomes more likely to be yellowish, and the transmittance at a wavelength in the vicinity of 500 to 600 nm is lowered. Thus, desirably, the content of $TiO_2$ is limited to a low level in the range of less than 0.2%.

Furthermore, even when fluorine, boron oxide, barium oxide, and strontium oxide are contained, the effect of the present invention is not impaired. However, these components create adverse impacts such as a cost increase, shortening a furnace life, release of harmful substances into the air or the like. Thus, the glass composition should be substantially free from these components.

As a component to be added as an oxidizing agent to a glass having the above-mentioned composition, preferably, cerium oxide in an amount in the range defined in the above description is used, in view of the effect of cerium oxide and an ultraviolet-absorbing effect as another particular effect of cerium oxide. However, an oxidizing agent other than cerium oxide, for example, manganese oxide may be added in an amount in the range of not more than 1% in combination with cerium oxide or as an only oxidizing agent.

Furthermore, $SnO_2$ may be added as a reducing agent in an amount in the range of not more than 1%. Moreover, as in a general case, in addition to the iron oxide, the cerium oxide and the manganese oxide that are described above, concurrently with the addition of these components, at least one selected from the group consisting of Se, CoO, $Cr_2O_3$, NiO, $V_2O_5$, $MoO_3$ or the like may be added as a coloring agent, in an amount in the range that allows the high transmittance that is the intended property of the present invention not to be impaired. However, when the coloring agent is added in an excessive amount, a color tone is intensified and the visible light transmittance is lowered. Thus, desirably, these compounds are not added practically. For example, desirably, the content of $V_2O_5$ is not more than 0.01 wt. %.

The effect of the high transmittance glass according to the present invention can be attained effectively when the high transmittance glass is subjected to quenching (tempering).

The high transmittance glass sheet according to the present invention is highly demanded particularly in use for a solar cell panel. When the glass sheet is used for a solar cell panel, an anti-reflecting film and a conductive film can be formed on the glass sheet. Even when these films are formed on the glass sheet, the glass properties are not affected. Further, regardless of whether these films are formed, the glass sheet can be subjected to processing involving heating such as tempering and bending. Generally, in rapidly cooling for tempering, the high transmittance glass sheet is heated to a temperature near the softening point of the glass sheet, and then cooled rapidly by being brought into contact with cold air or other fluids.

The high transmittance glass sheet according to the present invention generally has a thickness of 0.3 mm to 30 mm and is suitable for use for an interior glass, a showcase, a display case, a high transmittance non-colored window glass, a high transmittance non-colored mirror, a glass substrate for a solar cell panel, a cover glass plate for a solar cell panel, a solar water heater, a high solar-heat transmittance window glass, a window glass for a microwave oven, or a flat display substrate glass such as a front panel or the like.

EXAMPLE

Figure 3:
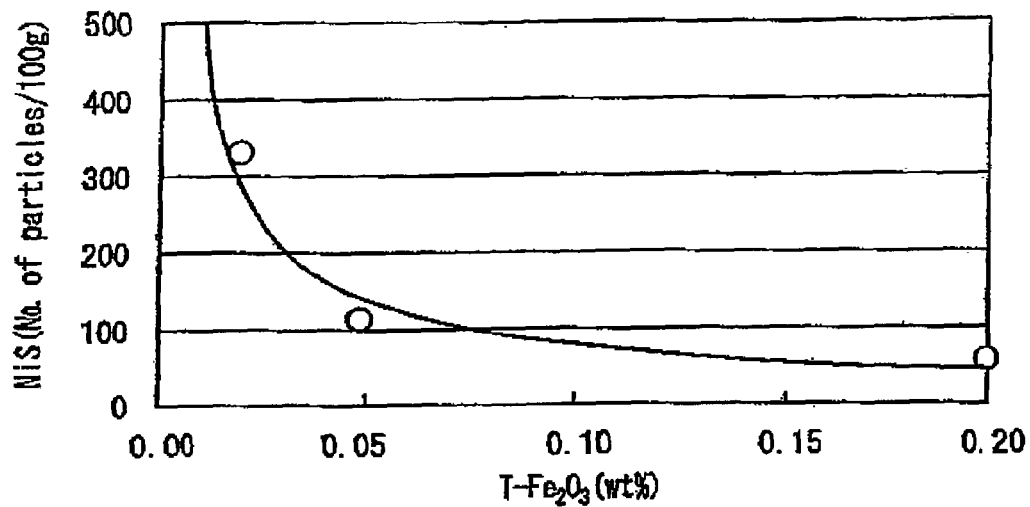
FIG. 3 is a graph showing a relationship between the content of $Fe_2O_3$ and a number of NiS particles formed in a soda-lime-silica glass.

With respect to soda-lime-silica glass in which Ni metal is contained intentionally, a relationship between the content of total iron oxide (in terms of $Fe_2O_3$) and the degree to which NiS is likely to be formed was examined. As can be seen from the results of the examination shown in FIG. 3, it was observed that NiS became more likely to be formed as the content of the total iron oxide was decreased from 0.20 wt. %, and in particular, the number of NiS particles formed increased steeply when the content of the total iron oxide was not more than 0.060 wt. %. Table 1 shows the respective values of the content of the total iron oxide, an amount of the Ni metal added, the number of the NiS particles formed, and the maximum diameter of the NiS particles that were used to obtain the results shown in FIG. 3. These results were obtained by using a crucible having a capacity of 250 $cm^3$. Also in actual melting and forming operations of soda-limesilica glass using a tank-type melting furnace, it was confirmed that a ratio of defects in a tempered glass sheet caused by soaking increased as the content of iron oxide in the glass was decreased from 0.20 wt. %.

TABLE 1

|  | Sample 1 | Sample 2 | Sample 3 |
|---|---|---|---|
| Content of total iron oxide (wt. %) | 0.018 | 0.050 | 0.200 |
| Content of Ni* (ppm) | 700 | 700 | 700 |
| NiS (no. of particles/ 100 g of glass) | 323 | 113 | 50 |
| Maximum diameter of NiS particle (μm) | 150 | 120 | 120 |

*Ni particles contained have a diameter of 149 μm.

Two types of raw materials varying in $Fe_2O_3$ content were prepared by mixing reagent chemicals or equivalents of $SiO_2$, $Al_2O_3$, MgO, $CaCO_3$, $Na_2CO_3$, $K_2CO_3$, $TiO_2$, $Na_2SO_4$, Fe, and carbon (C). In Table 2, Composition No. 1 represents soda-lime-silica glass having a $Fe_2O_3$ content of less than 0.02 wt. %, and Composition No. 2 represents soda-lime-silica glass having a $Fe_2O_3$ content of 0.05 wt. %. A relationship between the respective amounts of $Na_2SO_4$ and carbon that were used and an amount of resultant $SO_3$ was determined beforehand. In each composition, based on the relationship, an amount of $Na_2SO_4$ in terms of $Na_2O$ to be added was set to 0.74 wt. % so that the amount of resultant $SO_3$ shown in Table 2 was attained. The amount of $Na_2O$ was regulated so that the amount shown in Table 2 was attained by using $Na_2CO_3$. In Table 2, the respective contents are expressed in wt. %.

TABLE 2

|  | Composition No. 1 | Composition No. 2 |
|---|---|---|
| $SiO_2$ | 71.9 | 71.8 |
| $Al_2O_3$ | 1.9 | 1.9 |
| MgO | 3.9 | 3.9 |
| CaO | 8.2 | 8.2 |
| $Na_2O$ | 13.6 | 13.6 |
| $K_2O$ | 0.3 | 0.3 |
| $TiO_2$ | 0.030 | 0.030 |
| $CeO_2$ | 0 | 0 |
| $MnO_2$ | 0 | 0 |
| $SO_3$ | 0.200 | 0.200 |
| T—$Fe_2O_3$ | 0.018 | 0.050 |
| FeO in T—$Fe_2O_3$ | 0.005 | 0.015 |
| Total | 100.0 | 100.0 |

Glass batch materials of Samples 4 to 47 were prepared in the following manner. That is, with respect to each of these two types of raw materials, a powder of Ni metal having a particle diameter of 149 μm and a powder of zinc nitrate ($Zn(NO_3)_2.6H_2O$) or zinc sulfate ($ZnSO_4.7H_2O$) are added in the respective amounts shown in Tables 3 and 4. In the tables, A and B in the column titled "additive" represent zinc sulfate ($ZnSO_4.7H_2O$) and zinc nitrate ($Zn(NO_3)_2.6H_2O$), respectively.

With respect to each sample, a batch of these materials was put in an alumina crucible having a capacity of 250 cc and preheated at a temperature of 600° C. for 30 minutes. Then, the batch was inserted in an electric furnace maintained at a temperature of 1,370° C., and the temperature of the electric furnace was raised to 1,400° C. in 10 minutes. After being maintained at this temperature for 2.2 hours, the batch was taken out of the electric furnace and cast out to be annealed to room temperature, so that a glass sheet was obtained.

With respect to each glass obtained, the number of NiS particles was measured using a stereomicroscope. The results of the measurements are shown in Tables 3 and 4.

TABLE 3

|  | Composition No. | Amount of Ni added (ppm) | Additive* | Amount of additive in terms of ZnO (ppm) | NiS (no. of particles/ 100 g of glass) |
|---|---|---|---|---|---|
| Sample 4 | 1 | 350 | A | 0 | 300 |
| Sample 5 | 1 | 350 | A | 100 | 270 |
| Sample 6 | 1 | 350 | A | 200 | 290 |
| Sample 7 | 1 | 350 | A | 300 | 220 |
| Sample 8 | 1 | 350 | A | 400 | 230 |
| Sample 9 | 1 | 350 | A | 1,000 | 110 |
| Sample 10 | 1 | 140 | A | 0 | 52 |
| Sample 11 | 1 | 140 | A | 200 | 24 |
| Sample 12 | 1 | 35 | A | 0 | 4 |
| Sample 13 | 1 | 35 | A | 200 | 3 |
| Sample 14 | 1 | 35 | A | 300 | 2 |
| Sample 15 | 1 | 35 | A | 400 | 0 |
| Sample 16 | 1 | 140 | B | 0 | 52 |
| Sample 17 | 1 | 140 | B | 300 | 9 |
| Sample 18 | 2 | 350 | B | 0 | 57 |
| Sample 19 | 2 | 350 | B | 27 | 52 |
| Sample 20 | 2 | 350 | B | 68 | 46 |
| Sample 21 | 2 | 350 | B | 103 | 40 |
| Sample 22 | 2 | 350 | B | 205 | 33 |
| Sample 23 | 2 | 350 | B | 410 | 4 |
| Sample 24 | 2 | 175 | B | 0 | 27 |
| Sample 25 | 2 | 175 | B | 27 | 19 |

*Additive A represents zinc sulfate ($ZnSO_4.7H_2O$)
Additive B represents zinc nitrate ($Zn(NO_3)_2.6H_2O$)

TABLE 4

|  | Composition No. | Amount of Ni added (ppm) | Additive* | Amount of additive in terms of ZnO (ppm) | NiS (no. of particles/ 100 g of glass) |
|---|---|---|---|---|---|
| Sample 26 | 2 | 175 | B | 68 | 17 |
| Sample 27 | 2 | 175 | B | 103 | 14 |
| Sample 28 | 2 | 175 | B | 205 | 10 |
| Sample 29 | 2 | 87.5 | B | 0 | 13 |
| Sample 30 | 2 | 87.5 | B | 27 | 8 |
| Sample 31 | 2 | 87.5 | B | 68 | 2 |
| Sample 32 | 2 | 87.5 | B | 103 | 1 |
| Sample 33 | 2 | 87.5 | B | 205 | 0 |
| Sample 34 | 2 | 350 | A | 0 | 57 |
| Sample 35 | 2 | 350 | A | 50 | 54 |
| Sample 36 | 2 | 350 | A | 126 | 50 |
| Sample 37 | 2 | 350 | A | 189 | 46 |
| Sample 38 | 2 | 350 | A | 378 | 35 |
| Sample 39 | 2 | 350 | A | 756 | 14 |
| Sample 40 | 2 | 175 | A | 0 | 27 |
| Sample 41 | 2 | 175 | A | 50 | 20 |
| Sample 42 | 2 | 175 | A | 126 | 10 |
| Sample 43 | 2 | 175 | A | 189 | 2 |
| Sample 44 | 2 | 175 | A | 378 | 2 |
| Sample 45 | 2 | 87.5 | A | 0 | 15 |
| Sample 46 | 2 | 87.5 | A | 50 | 9 |
| Sample 47 | 2 | 87.5 | A | 126 | 0 |

It can be seen from Tables 3 and 4 that in each of the glasses containing 0.050 wt. % of T-$Fe_2O_3$ (Composition No. 2), by adding a trace amount of zinc nitrate ($Zn(NO_3)_2.6H_2O$) or zinc sulfate ($ZnSO_4.7H_2O$) to the glass materials, a considerable effect of suppressing the formation of NiS in a glass product can be obtained. On the other hand, it can be seen from the tables that, in each of the glasses containing less than 0.02 wt. % of T-$Fe_2O_3$ (Composition No. 1), an effect of preventing the formation of NiS cannot be obtained when the amount of zinc nitrate or zinc sulfate added is small, and can be obtained by increasing the amount of the zinc nitrate or the zinc sulfate to be added.

Figure 4:
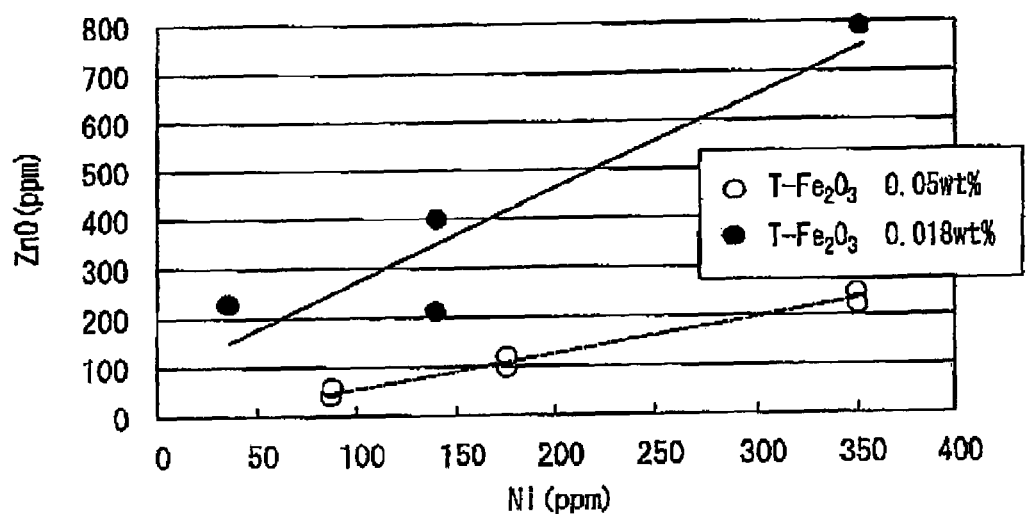
FIG. 4 is a graph showing a relationship between an amount of Ni added and the content of ZnO required to reduce the number of NiS particles to half in a soda-lime-silica glass.

Based on the results shown in Tables 3 and 4, with respect to each of glasses having the respective $Fe_2O_3$ contents, the rate of an amount of an additive in terms of ZnO at which the amount of NiS formed was reduced to half was determined. The results are plotted in FIG. 4. As is apparent from FIG. 4, compared with the glass containing 0.050 wt. % of T-$Fe_2O_3$, in the glass containing 0.018 wt. % of T-$Fe_2O_3$, in order to reduce the amount of NiS formed to half, it is required that zinc nitrate or zinc sulfate in terms of ZnO be used in a two- to four-fold amount, namely, of about not less than 100 ppm.

(Examples 1 to 18)

Glass batch materials having compositions shown in Tables 5 to 7, in which the respective contents are expressed in terms of oxide and in wt. %, were prepared using low-iron silica sand, alumina, limestone, dolomite, soda ash, salt cake, magnesium oxide, cerium oxide, manganese dioxide, zinc sulfate ($ZnSO_4.7H_2O$), and a carbon-based reducing agent. Each batch of these materials was heated in an electric furnace to a temperature of 1,450° C. to be melted. After four hours of melting, the batch was poured onto a stainless steel plate and annealed to room temperature, so that a glass sheet having a thickness of about 10 mm was obtained. In the tables, the values of concentration are expressed in wt. %.

After that, the surface of the glass sheet was ground so that a glass sheet sample having a thickness of 4.0 mm was obtained. With respect to each sample thus obtained, measurements were performed using the illuminant C for optical properties that are a visible light transmittance, a dominant wavelength, an excitation purity, a solar radiation transmittance, and a fluorescence intensity ratio. The fluorescence intensity ratio was determined in the following manner. That is, each of the samples described above was subjected to ultraviolet irradiation at a wavelength of 335 nm, and a fluorescence intensity was determined at the respective wavelengths. Then, a calculation was performed using the formula, fluorescence intensity ratio=(fluorescence intensity at 395 nm/fluorescence intensity at 600 nm) as an index of the fluorescence intensity. Further, water resistance was evaluated by determining an elution amount of $Na_2O$ (mg) according to JIS 3502. The respective values of the optical properties and the water resistance of each sample as the results of the measurements are shown in Tables 5 to 7.

In the same manner as in the above cases of Examples 1 to 18, 18 types of glass sheets (ZnO-added and Ni-added samples) that were about 10 mm in thickness were obtained. However, for each of these glass sheets, in preparation of a raw material, a powder of Ni metal having a particle diameter of 149 μm further was added in an amount of 150 ppm with respect to a total amount of the raw material (in terms of oxide). Further, in the same manner as in the above cases of the Examples 1 to 18, 18 types of glass sheets (ZnO-free and Ni-added samples) that were about 10 mm in thickness were obtained. However, for each of these glass sheets, in preparation of a raw material, zinc sulfate was not added, and a powder of Ni metal having a particle diameter of 149 μm was added in an amount of 150 ppm with respect to a total amount of the raw material (in terms of oxide).

With respect to these two sets of samples, measurements were performed for the number of NiS particles using a stereomicroscope. As the results of the measurements, in the samples to which ZnO was not added and Ni was added, 30 to 50 NiS particles per 100 g of glass were observed, while in the samples to which ZnO was added and Ni was added, 0 to 10 NiS particles per 100 g of glass were observed.

TABLE 5

| | 1 | 2 | 3 | 4 | 5 | 6 |
|---|---|---|---|---|---|---|
| $SiO_2$ | 71.1 | 70.4 | 69.8 | 69.7 | 68.0 | 71.5 |
| $Al_2O_3$ | 1.8 | 2.0 | 2.9 | 4.8 | 2.5 | 0.2 |
| MgO | 4.4 | 2.1 | 3.9 | 2.1 | 5.9 | 4.8 |
| CaO | 9.0 | 11.2 | 7.8 | 8.9 | 8.1 | 7.2 |
| $Na_2O$ | 12.6 | 12.9 | 14.6 | 13.2 | 14.1 | 15.1 |
| $K_2O$ | 0.8 | 1.1 | 0.7 | 0.9 | 0.9 | 0.9 |
| $SO_3$ | 0.23 | 0.22 | 0.28 | 0.09 | 0.12 | 0.14 |
| T—$Fe_2O_3$ | 0.019 | 0.019 | 0.018 | 0.018 | 0.016 | 0.016 |
| $TiO_2$ | 0.04 | 0.03 | 0.03 | 0.04 | 0.03 | 0.03 |
| $CeO_2$ | 0 | 0 | 0 | 0 | 0 | 0 |
| $MnO_2$ | 0 | 0 | 0 | 0 | 0 | 0 |
| Total | 100.0 | 100.0 | 100.0 | 100.0 | 100.0 | 100.0 |
| ZnO | 0.010 | 0.010 | 0.015 | 0.015 | 0.020 | 0.020 |
| FeO | 0.005 | 0.007 | 0.006 | 0.005 | 0.004 | 0.006 |
| FeO ratio (%) | 26 | 37 | 33 | 28 | 25 | 38 |
| Visible light transmittance (%) | 91.4 | 90.8 | 91.1 | 91.4 | 91.5 | 90.9 |
| Solar radiation transmittance (%) | 90.3 | 89.1 | 89.8 | 90.3 | 90.7 | 89.5 |
| Dominant wavelength (nm) | 558 | 552 | 553 | 557 | 562 | 552 |
| Excitation purity (%) | 0.19 | 0.18 | 0.18 | 0.19 | 0.19 | 0.17 |
| Fluorescence intensity ratio | 0 | 1 | 2 | 0 | 0 | 1 |
| Water resistance (mg) | 0.59 | 0.80 | 0.50 | 0.15 | 0.76 | 1.69 |

TABLE 6

| | Example | | | | | |
|---|---|---|---|---|---|---|
| | 7 | 8 | 9 | 10 | 11 | 12 |
| $SiO_2$ | 71.7 | 71.7 | 71.6 | 71.6 | 71.5 | 71.5 |
| $Al_2O_3$ | 1.7 | 1.7 | 1.7 | 1.7 | 1.7 | 1.7 |
| MgO | 4.2 | 4.2 | 4.2 | 4.2 | 4.2 | 4.2 |
| CaO | 8.5 | 8.5 | 8.5 | 8.5 | 8.5 | 8.5 |
| $Na_2O$ | 13.0 | 13.0 | 13.0 | 13.0 | 13.0 | 13.0 |
| $K_2O$ | 0.7 | 0.7 | 0.7 | 0.7 | 0.7 | 0.7 |
| $SO_3$ | 0.12 | 0.12 | 0.12 | 0.12 | 0.12 | 0.12 |
| T—$Fe_2O_3$ | 0.015 | 0.015 | 0.015 | 0.015 | 0.015 | 0.015 |
| $TiO_2$ | 0.02 | 0.02 | 0.02 | 0.02 | 0.02 | 0.02 |
| $CeO_2$ | 0 | 0.04 | 0.06 | 0.10 | 0.14 | 0.20 |
| $MnO_2$ | 0 | 0 | 0 | 0 | 0 | 0 |
| Total | 100.0 | 100.0 | 100.0 | 100.0 | 100.0 | 100.0 |
| ZnO | 0.040 | 0.040 | 0.040 | 0.040 | 0.040 | 0.040 |
| FeO | 0.004 | 0.003 | 0.003 | 0.002 | 0.002 | 0.001 |
| FeO ratio (%) | 27 | 20 | 20 | 13 | 13 | 7 |
| Visible light transmittance (%) | 91.2 | 91.6 | 91.6 | 91.7 | 91.6 | 91.6 |
| Solar radiation transmittance (%) | 90.0 | 90.7 | 90.6 | 91.1 | 91.0 | 91.3 |

TABLE 6-continued

|  | Example | | | | | |
| --- | --- | --- | --- | --- | --- | --- |
|  | 7 | 8 | 9 | 10 | 11 | 12 |
| Dominant wavelength (nm) | 554 | 565 | 565 | 570 | 571 | 573 |
| Excitation purity (%) | 0.19 | 0.20 | 0.20 | 0.20 | 0.24 | 0.30 |
| Fluorescence intensity ratio | 2 | 21 | 31 | 28 | 16 | 11 |
| Water resistance (mg) | 0.58 | 0.58 | 0.58 | 0.58 | 0.59 | 0.59 |

TABLE 7

|  | 13 | 14 | 15 | 16 | 17 | 18 |
| --- | --- | --- | --- | --- | --- | --- |
| $SiO_2$ | 71.0 | 71.7 | 71.6 | 72.0 | 71.1 | 71.1 |
| $Al_2O_3$ | 1.4 | 1.7 | 1.7 | 1.7 | 1.8 | 1.5 |
| MgO | 4.3 | 4.0 | 4.2 | 4.2 | 4.4 | 6.2 |
| CaO | 8.6 | 8.5 | 8.5 | 8.5 | 9.0 | 8.7 |
| $Na_2O$ | 13.5 | 13.0 | 13.0 | 12.5 | 12.6 | 11.1 |
| $K_2O$ | 0.7 | 0.7 | 0.7 | 0.7 | 0.7 | 1.0 |
| $SO_3$ | 0.22 | 0.23 | 0.20 | 0.21 | 0.23 | 0.23 |
| T—$Fe_2O_3$ | 0.019 | 0.019 | 0.011 | 0.011 | 0.013 | 0.013 |
| $TiO_2$ | 0.03 | 0.03 | 0.04 | 0.04 | 0.04 | 0.04 |
| $CeO_2$ | 0.22 | 0.10 | 0.05 | 0.06 | 0.10 | 0.10 |
| $MnO_2$ | 0 | 0.06 | 0 | 0.08 | 0 | 0 |
| Total | 100.0 | 100.0 | 100.0 | 100.0 | 100.0 | 100.0 |
| ZnO | 0.020 | 0.020 | 0.050 | 0.050 | 0.040 | 0.40 |
| FeO | 0.001 | 0.002 | 0.002 | 0.001 | 0.002 | 0.002 |
| FeO ratio (%) | 5 | 11 | 18 | 9 | 15 | 15 |
| Visible light transmittance (%) | 91.6 | 91.6 | 91.7 | 91.8 | 91.7 | 91.7 |
| Solar radiation transmittance (%) | 91.2 | 91.0 | 91.0 | 91.3 | 90.9 | 90.9 |
| Dominant wavelength (nm) | 573 | 570 | 567 | 570 | 568 | 568 |
| Excitation purity (%) | 0.31 | 0.23 | 0.20 | 0.21 | 0.20 | 0.20 |
| Fluorescence intensity ratio | 9 | 26 | 27 | 27 | 28 | 28 |
| Water resistance (mg) | 0.79 | 0.57 | 0.52 | 0.44 | 0.53 | 0.44 |

As discussed in the foregoing description, according to the present invention, 0.006 to 0.20 wt. % of zinc oxide is contained in a soda-lime-silica glass containing total iron oxide in terms of $Fe_2O_3$ in an amount of less than 0.02 wt. %, and thus a sufficient effect of reducing or eliminating the formation of NiS particles can be attained, thereby allowing an improved quality glass product to be obtained.

Furthermore, the addition of the zinc oxide has almost no influence on visible light transmittance and ultraviolet transmittance, and also has no influence on physical property values of the glass in terms of a coloring property, viscosity, expansion or the like. Thus, particularly, the general glass quality can be maintained, while securing high transmittance, thereby achieving a substantial advantage from a practical viewpoint.

Furthermore, the present invention allows manufacturing of glass products containing almost no NiS. Thus, also in a process of manufacturing a tempered glass, a heating (soaking) process for removing glasses containing NiS can be omitted after a quench tempering process, thereby allowing a manufacturing cost to be reduced. Further, a rate of glass breakage caused in soaking can be lowered, thereby allowing product yield to be improved.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of manufacturing a soda-lime glass comprising zinc oxide and iron oxide (expressed as total iron oxide) wherein formation of nickel sulfide particles is suppressed in said glass, comprising adding a zinc compound to glass raw materials and melting said glass raw materials;

wherein the soda lime glass is formulated by either:
decreasing a content of the zinc oxide within a range of 0.006 to 2.0 wt. %, when the content of total iron oxide (in terms of $Fe_2O_3$) in a glass is increased within a range of 0.005 wt. % to 0.06 wt. %, or
increasing the content of the zinc oxide within a range of 0.006 to 2.0 wt. %, when the content of total iron oxide (in terms of $Fe_2O_3$) in a glass is decreased within a range of 0.005 wt. % to 0.06 wt. %,
thereby suppressing formation of nickel sulfide particles in the glass and
whereby the soda-lime glass exhibits high transmittance with a visible light transmittance of 90.0% or higher on a basis of a 4.0 mm thick glass sheet.

2. A method of manufacturing a soda-lime glass comprising zinc oxide and iron oxide (expressed as total iron oxide) wherein formation of nickel sulfide particles is suppressed in said glass, comprising adding a zinc compound to glass raw materials and melting said glass raw materials;

wherein the soda-lime glass is formulated by either:
decreasing a content of the zinc oxide within a range of 0.006 to 2.0 wt. %, when a content of total iron oxide (in terms of $Fe_2O_3$) in a glass is increased within a range of 0.005 wt. % to 0.02 wt. %, or
increasing the content of the zinc oxide within a range of 0.006 to 2.0 wt. %, when a content of total iron oxide (in terms of $Fe_2O_3$) in a glass is decreased within a range of 0.005 wt. % to 0.02 wt. %,
thereby suppressing formation of nickel sulfide particles in the glass and
whereby the soda-lime glass exhibits high transmittance with a visible light transmittance of 90.0% or higher on a basis of a 4.0 mm thick glass sheet.

* * * * *